(12) United States Patent
Eschenmoser et al.

(10) Patent No.: US 11,112,029 B2
(45) Date of Patent: Sep. 7, 2021

(54) VACUUM VALVE COMPRISING A FORCE SENSOR

(71) Applicant: VAT HOLDING AG, Haag (CH)

(72) Inventors: Adrian Eschenmoser, Grabs (CH); Andreas Hofer, Widnau (CH)

(73) Assignee: VAT HOLDING AG, Haag (CH)

( * ) Notice: Subject to any disclaimer, the term of this patent is extended or adjusted under 35 U.S.C. 154(b) by 31 days.

(21) Appl. No.: 16/606,644

(22) PCT Filed: Apr. 19, 2018

(86) PCT No.: PCT/EP2018/059988
§ 371 (c)(1),
(2) Date: Oct. 18, 2019

(87) PCT Pub. No.: WO2018/193014
PCT Pub. Date: Oct. 25, 2018

(65) Prior Publication Data
US 2020/0056722 A1    Feb. 20, 2020

(30) Foreign Application Priority Data

Apr. 19, 2017 (EP) ..................... 17167054

(51) Int. Cl.
*F16K 37/00* (2006.01)
*F16K 3/10* (2006.01)
(Continued)

(52) U.S. Cl.
CPC ............ *F16K 37/0041* (2013.01); *F16K 3/10* (2013.01); *F16K 3/18* (2013.01); *F16K 51/02* (2013.01); *G01L 1/22* (2013.01)

(58) Field of Classification Search
CPC .......... F16K 1/02; F16K 1/2007; F16K 1/205; F16K 1/2057; F16K 1/24; F16K 3/0218;
(Continued)

(56) References Cited

U.S. PATENT DOCUMENTS 3,145,969 A   8/1964  Von Zweck
5,029,597 A   7/1991  Leon
(Continued)

FOREIGN PATENT DOCUMENTS

DE    1264191 B1   3/1968
DE    7731993 U1   1/1978
(Continued)

OTHER PUBLICATIONS

International Search Report and Written Opinion dated Apr. 19, 2018 in International Application No. PCT/EP2018/059988.

*Primary Examiner* — Hailey K. Do
(74) *Attorney, Agent, or Firm* — Muncy, Geissler, Olds & Lowe, P.C.

(57) ABSTRACT

The invention relates to a vacuum valve comprising a sensor assembly with at least one force sensor which has a deformation-sensitive element. The sensor assembly is designed such that a measurement signal relating to a compression of the seal (TO) which lies between a first and a second seal surface, said compression being produced by the first and the second seal surface, is detected by means of the sensor assembly.

19 Claims, 5 Drawing Sheets

Figure 1A:
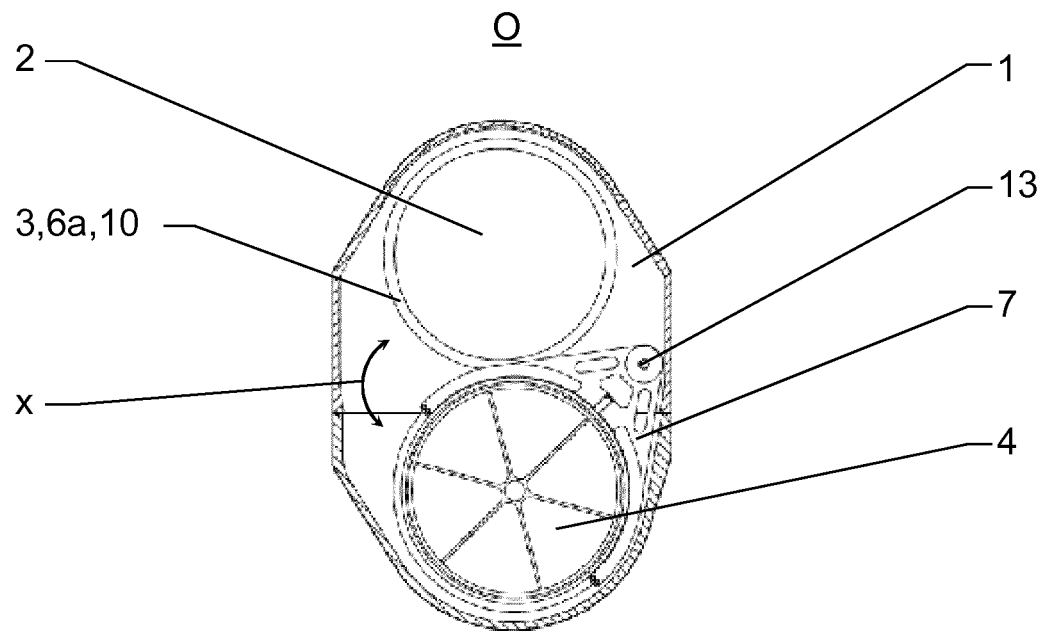

(51) Int. Cl.
  *F16K 3/18* (2006.01)
  *G01L 1/22* (2006.01)
  *F16K 51/02* (2006.01)

(58) Field of Classification Search
  CPC . F16K 3/0254; F16K 3/10; F16K 3/18; F16K 3/188; F16K 37/0041
  See application file for complete search history.

(56) References Cited

U.S. PATENT DOCUMENTS

| | | | |
|---|---|---|---|
| 5,220,843 A * | 6/1993 | Rak | G01L 5/0061 251/129.04 |
| 5,577,707 A | 11/1996 | Brida | |
| 6,056,266 A | 5/2000 | Blecha | |
| 6,089,537 A | 7/2000 | Olmsted | |
| 6,416,037 B1 | 7/2002 | Geiser | |
| 6,629,682 B2 | 10/2003 | Duelli | |
| 2005/0067603 A1 | 3/2005 | Lucas et al. | |
| 2010/0116349 A1* | 5/2010 | Fischer | F16K 3/18 137/14 |
| 2018/0339816 A1* | 11/2018 | Oldendorf | F16K 1/24 |

FOREIGN PATENT DOCUMENTS

| | | |
|---|---|---|
| DE | 3447008 C2 | 6/1986 |
| DE | 102007034926 A1 | 2/2009 |
| DE | 10 2008 050 251 A1 | 4/2010 |
| EP | 2413009 A2 | 2/2012 |
| KR | 20110070237 A | 6/2011 |
| WO | 2008141661 A2 | 11/2008 |

\* cited by examiner

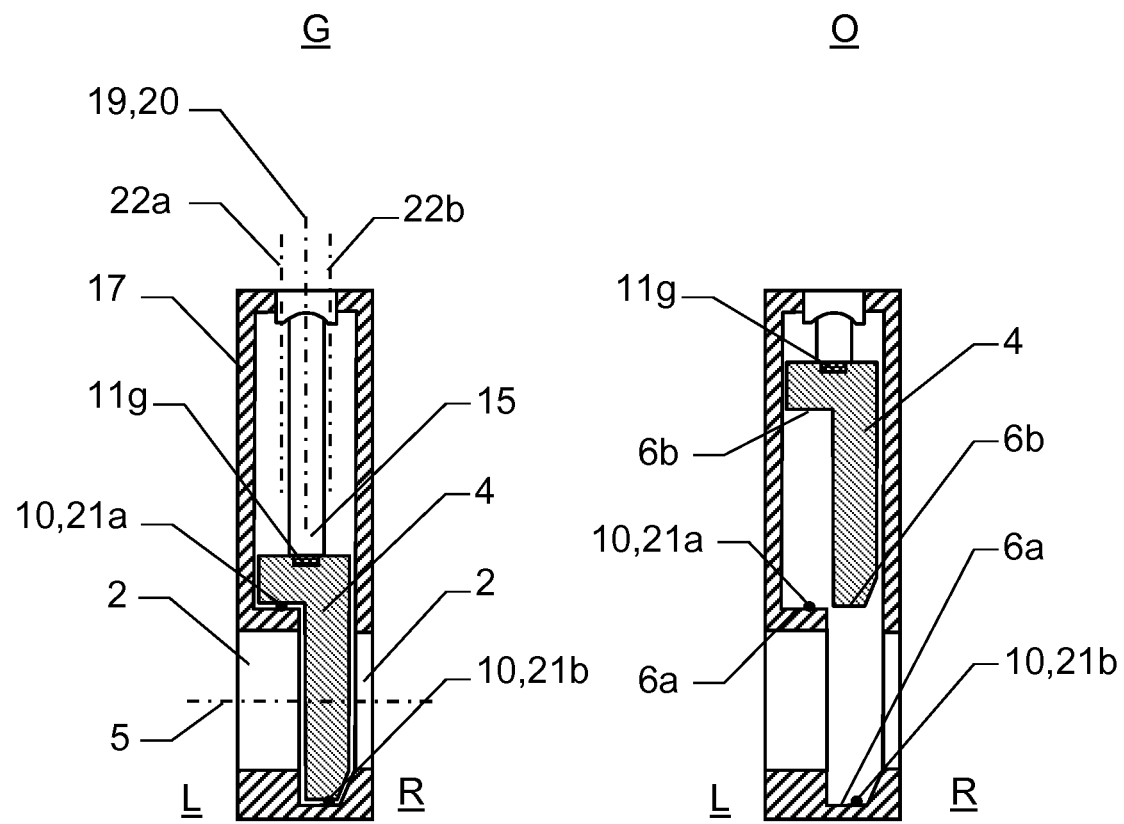

VACUUM VALVE COMPRISING A FORCE SENSOR

This application is a 371 National Phase of PCT Application No. PCT/EP2018/059988, filed on Apr. 19, 2018; which claims priority to European Patent application 17167054.0 filed Apr. 19, 2017 and each of which is herein incorporated by reference in its entirety.

The invention relates to a vacuum valve comprising a sensor assembly having at least one force sensor comprising a deformation-sensitive element.

Vacuum valves for regulating a volume or mass flow and/or for substantially gas-tight closing of a flow path which leads through an opening formed in a valve housing are generally known in different embodiments from the prior art and are used in particular in vacuum chamber systems in the field of IC, semiconductor, or substrate manufacturing, which has to take place in a protected atmosphere as much as possible without the presence of contaminating particles. Such vacuum chamber systems comprise in particular at least one evacuable vacuum chamber, which is provided for accommodating semiconductor elements or substrates to be processed or produced, and which has at least one vacuum chamber opening, through which the semiconductor elements or other substrates are guidable into and out of the vacuum chamber, and also at least one vacuum pump for evacuating the vacuum chamber. For example, in a manufacturing facility for semiconductor wafers or liquid crystal substrates, the highly-sensitive semiconductor or liquid crystal elements pass through multiple process vacuum chambers sequentially, in which the parts located inside the process vacuum chambers are each processed by means of a processing device. Both during the processing process within the process vacuum chambers and also during the transportation from chamber to chamber, the highly-sensitive semiconductor elements or substrates always have to be located in protected atmosphere—in particular in an airless environment.

For this purpose, on the one hand, peripheral valves for opening and closing a gas supply or exhaust and, on the other hand, transfer valves for opening and closing the transfer openings of the vacuum chambers for the introduction and removal of the parts are used.

The vacuum valves through which semiconductor parts pass are also referred to as vacuum transfer valves because of the described area of application and the dimensioning linked thereto, also as rectangular valves because of the predominantly rectangular opening cross section thereof, and also slide valves, rectangular slides, or transfer slide valves because of the typical functionality thereof.

Peripheral valves are used in particular for controlling or regulating the gas flow between a vacuum chamber and a vacuum pump or a further vacuum chamber. Peripheral valves are located, for example, inside a pipe system between a process vacuum chamber or a transfer chamber and a vacuum pump, the atmosphere, or a further process vacuum chamber. The opening cross section of such valves, also called pump valves, is generally smaller than in the case of a vacuum transfer valve. Because peripheral valves, depending on the area of use, are used not only for the complete opening and closing of an opening, but rather also for controlling or regulating a flow rate by continuous adjustment of the opening cross section between a completely open position and a gas-tight closed position, they are also referred to as regulating valves. One possible peripheral valve for controlling or regulating the gas flow is the pendulum valve.

In a typical pendulum valve, as known, for example, from U.S. Pat. No. 6,089,537 (Olmsted), in a first step, a generally round valve plate is rotationally pivoted over an opening, which is generally also round, from a position releasing the opening into an intermediate position covering the opening. In the case of a slide valve, as described, for example, in U.S. Pat. No. 6,416,037 (Geiser) or U.S. Pat. No. 6,056,266 (Blecha), the valve plate, and also the opening, is usually designed as rectangular and is linearly displaced in this first step from a position which releases the opening into an intermediate position covering the opening. In this intermediate position, the valve plate of the pendulum or slide valve is located in a spaced-apart position opposite to the valve seat enclosing the opening. In a second step, the distance between the valve plate and the valve seat is reduced, and therefore the valve plate and the valve seat are uniformly pressed against one another and the opening is closed substantially gas-tight. This second movement preferably takes place substantially in a perpendicular direction to the valve seat. The sealing can either take place via a sealing ring arranged on the closure side of the valve plate, which is pressed onto the valve seat circumferential around the opening, or via a sealing ring on the valve seat, against which the closure side of the valve plate is pressed. Due to the closing procedure occurring in two steps, the sealing ring between the valve plate and the valve seat is hardly subjected to shear forces, which would destroy the sealing ring, since the movement of the valve plate in the second step takes place substantially linearly perpendicularly onto the valve seat.

Different seal devices are known from the prior art, for example, from U.S. Pat. No. 6,629,682 B2 (Duelli). One suitable material for sealing rings and seals in vacuum valves is, for example, fluorinated rubber, also called FKM, in particular the fluoroelastomer known under the tradename "Viton", and also perfluoronated rubber, abbreviated FFKM.

Different drive systems are known from the prior art for achieving this combination of a rotational movement in the pendulum valve and a translational movement in the slide valve of the valve plate in parallel over the opening and an substantially translational movement perpendicular to the opening, for example, from U.S. Pat. No. 6,089,537 (Olmsted) for a pendulum valve and from U.S. Pat. No. 6,416,037 (Geiser) for a slide valve.

The pressing of the valve plate against the valve seat has to take place such that both the required gas-tightness is ensured within the entire pressure range, and also damage to the seal medium, in particular the sealing ring in the form of an O-ring, due to excessively high pressure strain is avoided. To ensure this, known valves provide a contact pressure regulation of the valve plate regulated as a function of the pressure difference prevailing between the two valve plate sides. In particular in the case of large pressure variations or the change from partial vacuum to overpressure, or vice versa, a uniform force distribution along the entire circumference of the sealing ring cannot always be ensured, however. In general, the attempt is made to decouple the sealing ring from support forces, which result from the pressure applied to the valve. In U.S. Pat. No. 6,629,682 (Duelli), a vacuum valve having a seal medium is proposed for this purpose, for example, which is composed of a sealing ring and an adjacent support ring, and therefore the sealing ring is substantially freed of support forces.

To achieve the required gas-tightness, possibly both for overpressure and also partial vacuum, additionally or alternatively to the second movement step, some known pendulum valves or slide valves provide a valve ring, which is displaceable perpendicularly to the valve plate and encloses the opening, and which is pressed onto the valve plate for the gas-tight closing of the valve. Such valves having valve rings actively displaceable in relation to the valve plate are known, for example, from DE 1 264 191 B1, DE 34 47 008 C2, U.S. Pat. No. 3,145,969 (von Zweck), and DE 77 31 993 U. In U.S. Pat. No. 5,577,707 (Brida), a pendulum valve comprising a valve housing having an opening and a valve plate pivotable in parallel over the opening for controlling a flow rate through the opening is described. A valve ring which encloses the opening is actively movable perpendicularly in the direction toward the valve plate by means of multiple springs and compressed air cylinders. A possible refinement of this pendulum valve is proposed in US 2005/0067603 A1 (Lucas et al.).

Since the above-mentioned valves are used, inter alia, during the production of highly-sensitive semiconductor components in a vacuum chamber, a corresponding sealing effect also has to be reliably ensured for such process chambers. In particular the status of a sealing material or a sealing surface which comes into contact with the sealing material upon compression is significant for this purpose. In the course of the operating life of a vacuum valve, wear of the sealing material or the sealing surfaces can typically occur.

To avoid a leak which possibly occurs in this case or to keep the quality of the seal at a sufficiently high level consistently, a valve closure can typically be replaced or restored at specific time intervals. Such a maintenance cycle is usually dimensioned in this case based on the number of the opening and closing cycles to be expected in a certain period of time. The maintenance thus typically takes place as a precaution to be able to preclude the occurrence of a leak beforehand as much as possible.

Such a maintenance requirement is not solely restricted to the sealing material or the valve plate, but rather also extends in particular to the valve seat, which forms a part of the vacuum valve corresponding to the valve plate. The structure of a sealing surface on the part of the valve seat, for example, a groove incorporated into the valve seat, is also affected by a mechanical strain. A structural change of the groove resulting from operation of the valve can therefore also cause an impairment of the seal. Corresponding maintenance intervals are typically also defined for this purpose.

One disadvantage of this valve maintenance is the precautionary character thereof. The parts affected by the maintenance are usually restored or replaced before the passage of the regular or actual service life thereof. Any such maintenance step generally requires a certain shutdown time for a production process and increased technical and financial expenditure. In total this then means a shutdown of the production at intervals which are shorter than required, and more frequently than would be necessary at all.

The invention is therefore based on the object of providing an improved vacuum valve, which enables optimized operation and thus an improvement, i.e., an extension, of the service life of individual valve parts.

A further object of the invention is to provide an improved vacuum valve which enables optimized valve maintenance and therefore an improvement, i.e., shortening of any possible process shutdowns.

A further object of the invention is to provide such a valve system, using which a more reliable gas-tight sealing of a process volume can be achieved, in particular wherein the quality of the sealing is predictable.

These objects are achieved by the implementation of the characterizing features of the independent claims. Features which refine the invention in an alternative or advantageous manner can be inferred from the dependent patent claims.

The fundamental concept of the present invention is to combine a vacuum valve with a sensor assembly comprising at least one force sensor and to design the valve and the sensor assembly in this case such that monitoring and reducing of seal wear of the vacuum valve can be carried out thereby. With the aid of a pressure sensor for detecting a seal compression, which is generated by the sealing surfaces corresponding to one another, of the seal located between the sealing surfaces, the compression force can be measured and possibly regulated independently of the wear of the other components, for example, wherein the seal wear can be reduced by different seal compressions for differential pressure and without differential pressure. The maintenance expenditure is thus reduced in particular and the maintenance intervals can accordingly be extended.

Furthermore, measurement signals can then be acquired by means of the sensor assembly and an item of status information of the vacuum valve can be derived on the basis of these signals, for example, with respect to a contact pressure of the sealing surfaces on the seal, for example, to derive a structural embodiment of the sealing surface (seal material). The status of the vacuum valve can thus be monitored and evaluated progressively. A maintenance or replacement point in time of individual components, for example, of the sealing surface, can be determined by means of the data thus able to be generated. For example, a failure of the leak-tightness of the valve can thus be substantially predicted and a (chronologically) punctual tailored countermeasure can be initiated. Maintenance intervals can thus be planned better and carried out more efficiently, wherein the process integrity remains ensured and secured simultaneously.

A surface behavior (compressibility) of parts of the sealing surface or an elastomeric seal material can be used as relevant status information for the seal wear of the vacuum valve, for example.

The pressure sensor can be based, for example, on a strain gauge force sensor, wherein the strain gauge sensor is vapor deposited for this purpose on one side of the pressure sensor, for example. The compression can then be set individually, for example, by the electric drive. In a pneumatic L-motion drive, it could also be checked whether the valve is closed using the sensor.

The invention relates to a vacuum valve, for example a vacuum slide valve, a pendulum valve, or a monovalve, for the regulation of a volume or mass flow and/or for the gas-tight interruption of a flow path, wherein the vacuum valve comprises a valve seat, which comprises a valve opening defining an opening axis, which can connect, for example, a first gas region to a second gas region, and a first sealing surface circumferential around the valve opening. The vacuum valve furthermore comprises a valve closure, in particular a valve plate, for the regulation of the volume or mass flow and/or for the interruption of the flow path, having a second sealing surface corresponding to the first sealing surface, the variable location of which is determined by a respective position and alignment of the valve closure.

In this case, the valve seat can be an integral component of the vacuum valve and in particular can embody a part of the valve housing. Alternatively, the valve seat can be formed by the opening of a vacuum chamber and can form a vacuum valve in the meaning of the present invention by cooperating with the valve closure movable in relation to the valve seat.

In particular, one of the two sealing surfaces comprises a seal made of seal material. The seal material can be, for example, a polymer-based material (for example, elastomer, in particular fluoroelastomer), which is vulcanized onto the sealing surface or is provided as an O-ring in a groove in the valve closure or the valve seat. Sealing surfaces are thus preferably considered in the scope of the invention to be the surfaces between which a seal made of seal material is provided in compressed form to close the valve opening (closed position).

A drive unit is coupled to the valve closure, which is designed in such a way that the valve closure is variable and settable in a defined manner to provide respective valve opening states, which are defined by respective positions of the valve closure. The valve closure is adjustable from an open position, in which the valve closure and the valve seat are provided without contact in relation to one another, into a closed position, in which an axially sealing contact exists between the first sealing surface and the second sealing surface via an interposed seal and the valve opening is thus closed gas-tight, and back.

The drive unit is designed, for example, as an electric motor (stepping motor) or as a combination of multiple motors or as a pneumatic drive. In particular, the drive provides a movement of the valve closure in at least two (substantially orthogonal) directions.

The vacuum valve furthermore comprises a sensor assembly having at least one force sensor comprising a deformation-sensitive element, for example, a strain gauge force sensor, wherein the sensor assembly is designed in such a manner that a measurement signal with respect to a seal compression generated by the first and the second sealing surfaces of the seal located between the first and the second sealing surfaces is acquired by the sensor assembly.

In one embodiment, the vacuum valve comprises a monitoring and control unit for activating the drive unit using predefined control values to adjust the valve closure between the open position and the closed position, wherein the drive unit, the valve closure, and the sensor assembly are designed and interact in such a way that the control values are set based on the measurement signal, in particular in such a way that the measurement signal continuously corresponds to a predefined target value.

In this case, the vacuum valve, the sensor assembly, and the monitoring and control unit can be configured, for example, in such a way that the sensor assembly is in one-sided or two-sided communication, for example, via a conventional wired or wireless connection, with the monitoring and control unit for a provision and transmission of the measurement signal.

The vacuum valve can furthermore, for example, comprise a processing unit designed in such a manner, in particular provided by the monitoring and control unit or the sensor assembly, that an acquired measurement signal is processable by means of the processing unit and an item of status information can be generated on the basis of the measurement signal. The acquired measurement signals can then be further processed and provided for the provision of an item of status information which can be evaluated, for example, for the valve regulation by the monitoring and control unit or as user information.

The status information can provide, for example, an item of information with respect to a mechanical and/or structural integrity of the first sealing surface and/or the second sealing surface and/or the seal, for example, based on an actual-target comparison for the acquired measurement signal, for example, based on an acquired and an expected contact pressure for a reference setting of the drive unit.

Furthermore, based on the status information, an output signal can be provided, which specifies a relationship of the acquired measurement signal to defined tolerance values. Thus, in particular an evaluation can take place with respect to a process controlled by the vacuum valves, for example, an evaluation as to whether a required sealing effect is achieved, or any possible soiling or damage of the sealing surface can be recognized. For example, it can then be indicated to a user by visual or acoustic signal whether a process runs within the required tolerances or an undesired undershoot or overshoot of such a tolerance (for example, pressure level) is to be expected.

According to one embodiment of the invention, the sensor assembly can be designed, for example, in such a way that the measurement signal acquires a force acting from at least one part of the seal on at least one part of the first sealing surface and/or a force acting from at least one part of the seal on at least one part of the second sealing surface.

For example, a force sensor can be provided for measuring the acting forces due to the valve closure, for example, wherein the force sensor is arranged in the valve closure, in particular for acquiring a force of the two sealing surfaces on the remaining parts of the valve closure.

A force sensor can furthermore also be provided by the valve seat, in particular for acquiring a force of the first sealing surface on the remaining parts of the valve seat.

In one embodiment, the sensor assembly is designed, for example, in such a way that the deformation-sensitive element is arranged on a part of the valve seat or the valve closure comprising at least one part of the first and/or the second sealing surface.

For example, the sensor assembly can be designed in such a way that at least a part of the deformation-sensitive element forms at least a part of the first sealing surface, wherein, for example, a pressure-sensitive element of a force sensor is applied on the seal side on at least a part of the part of the valve seat comprising the first sealing surface.

In a similar manner, the sensor assembly can be designed, for example, in such a way that at least a part of a further deformation-sensitive element forms at least a part of the second sealing surface.

Furthermore, for example, at least a part of the deformation-sensitive element can be arranged on the valve seat side under a seal material forming at least a part of the first sealing surface and applied to the valve seat, for example, vapor deposited directly on the part of the valve seat under the seal material or on the seal material. In a similar manner, for example, at least a part of a further deformation-sensitive element can be arranged on the valve plate side under a seal material forming at least a part of the second sealing surface and applied to the valve plate.

In a further embodiment, the valve closure is coupled via a first coupling component to the drive unit and the sensor assembly is designed in such a way that the measurement signal acquires a force from the first coupling component on the valve closure and/or from the first coupling component on the drive unit and/or from the valve closure on the first coupling component and/or from the drive unit on the first coupling component.

For example, multiple force sensors of the sensor assembly can be arranged at different points for this purpose, for example, at contact points of the valve closure with the first coupling component or the drive unit with the first coupling component. The individual force sensors can then be used, for example, in such a way that each of the forces acting on the force sensors are acquired directly.

However, for example, a contact pressure with respect to a point in the vacuum valve, which is not directly acquired by the assembly of the individual force sensor in the vacuum valve, can also be derived via a single force sensor via the knowledge of structural features of parts of the vacuum valve. An assembly of an individual force sensor can thus be sufficient under given circumstances for a valve regulation and/or for acquiring the status of the vacuum valve.

It is also advantageous in particular in this case that the sensor assembly can be designed, for example, in such a way that, for example, a force sensor does not have to be moved into the vacuum region itself and thus a comparatively lower constructive expenditure can be ensured.

One embodiment therefore relates to a vacuum valve having a vacuum region separated from an external environment, wherein force sensors of the sensor assembly contributing to the measurement signal are arranged outside the vacuum region.

In a further embodiment of the invention, the vacuum valve comprises a first valve housing, wherein the drive unit is connected to the first valve housing, the valve closure is coupled via a second coupling component to the drive unit, and the second coupling component presses against a first support element, which is connected to the first valve housing, for controlled guiding of the second coupling component. The sensor assembly can be designed in such a way that the measurement signal acquires a force from the first coupling component on the first support element and/or from the first support element on the second coupling component.

A further embodiment of the invention relates to an embodiment, wherein the valve closure is coupled via a third coupling component to the drive unit, wherein the third coupling component comprises at least one adjustment arm and the adjustment arm is mechanically coupled to the valve closure and the drive unit, wherein by adjusting the adjustment arm by means of the drive unit, the valve closure is adjustable between the open position and the closed position substantially parallel to the valve seat. For example, transfer valves are often based on such a coupling assembly.

The sensor assembly according to the invention can thus be designed in such a way, for example, that the measurement signal acquires a force from the adjustment arm on the valve closure and/or from the valve closure on the adjustment arm, and/or from the adjustment arm on the drive unit and/or from the drive unit on the adjustment arm.

For the controlled guiding of the adjustment arm, the vacuum valve can comprise, for example, a guide component for at least one-sided guiding or support, respectively, of the adjustment arm on the valve housing. In particular, the support can thus furthermore provide a force sensor or can be replaced by a force sensor.

In a further embodiment, the drive unit is connected to a second valve housing of the vacuum valve, the valve closure is coupled via the third coupling component, which comprises an adjustment arm, to the drive unit, and the adjustment arm presses against a second support element connected to the second valve housing for controlled guiding of the adjustment arm, wherein the sensor assembly is designed in such a way that the measurement signal acquires a force from the adjustment arm on the second support element and/or from the second support element on the adjustment arm.

For example, for this purpose at least one of the following can comprise the force sensor of the sensor assembly comprising the deformation-sensitive element: the valve closure, the second support element, the drive unit, and the third coupling component, in particular the adjustment arm.

A single force sensor can be arranged in this case, for example, directly on or spaced apart from contact points of the valve closure having the adjustment arm, the adjustment arm having the support element, and/or the drive unit having the adjustment arm. In particular, individual force sensors can be used, for example, in such a way that in each case the forces acting on the individual force sensor are acquired directly, or a contact pressure with respect to a point in the vacuum valve is derived, which is not acquired directly by the assembly of the individual force sensor in the vacuum valve.

The sensor assembly is especially designed in each case in such a way that the compression force can be measured independently of the wear of individual valve components, in particular the drive components.

The vacuum valve according to the invention will be described in greater detail hereafter solely by way of example on the basis of exemplary embodiments schematically illustrated in the drawings. Identical elements are identified by identical reference signs in the figures. The described embodiments are generally not shown to scale and they are also not to be understood as restrictive.

In the individual figures

Figure 2A:
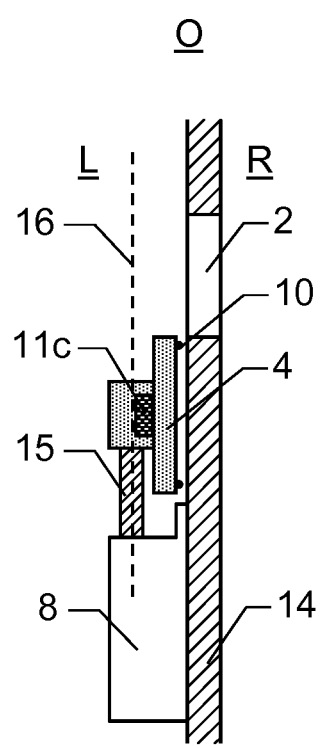
Figure 2B:
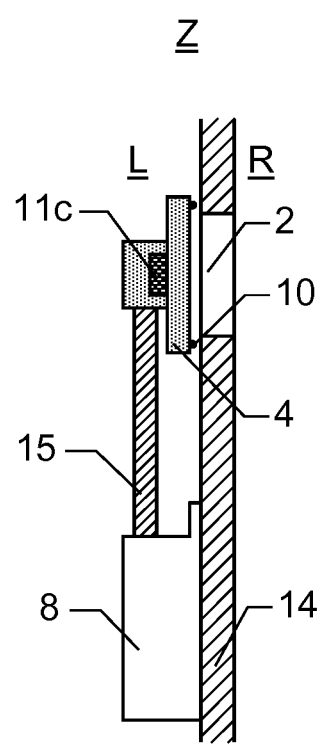
Figure 2C:
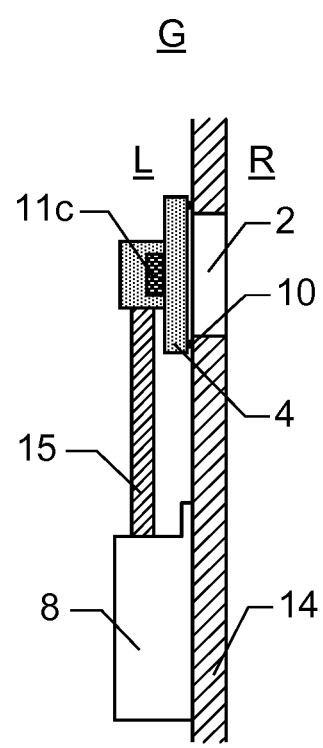
Figure 3A:
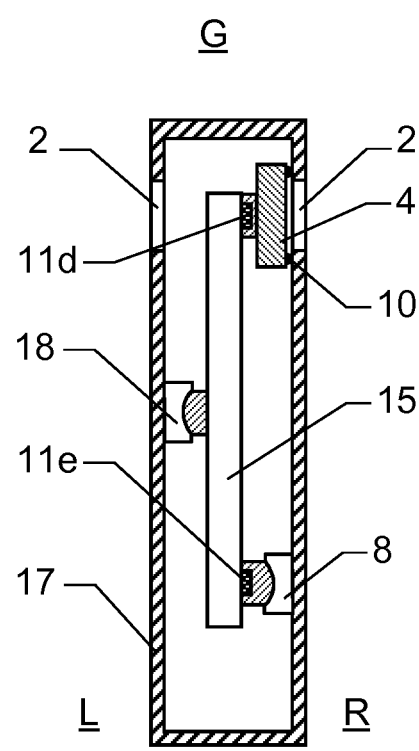
Figure 4A:
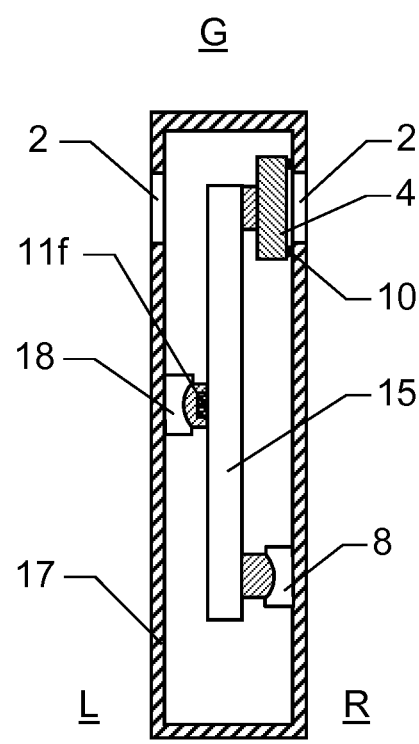

FIGS. 1a, b show a possible embodiment of a vacuum valve according to the invention as a pendulum valve;

FIGS. 2a-c show a possible embodiment of a vacuum valve according to the invention as a transfer valve;

FIGS. 3a, b show a schematic illustration of a sensor assembly according to the invention in a transfer valve having two force sensors;

FIGS. 4a, b show a schematic illustration of a further sensor assembly according to the invention in a transfer valve having a force sensor;

FIGS. 5a, b show a schematic illustration of a further sensor assembly according to the invention in a monovalve.

Figure 1B:
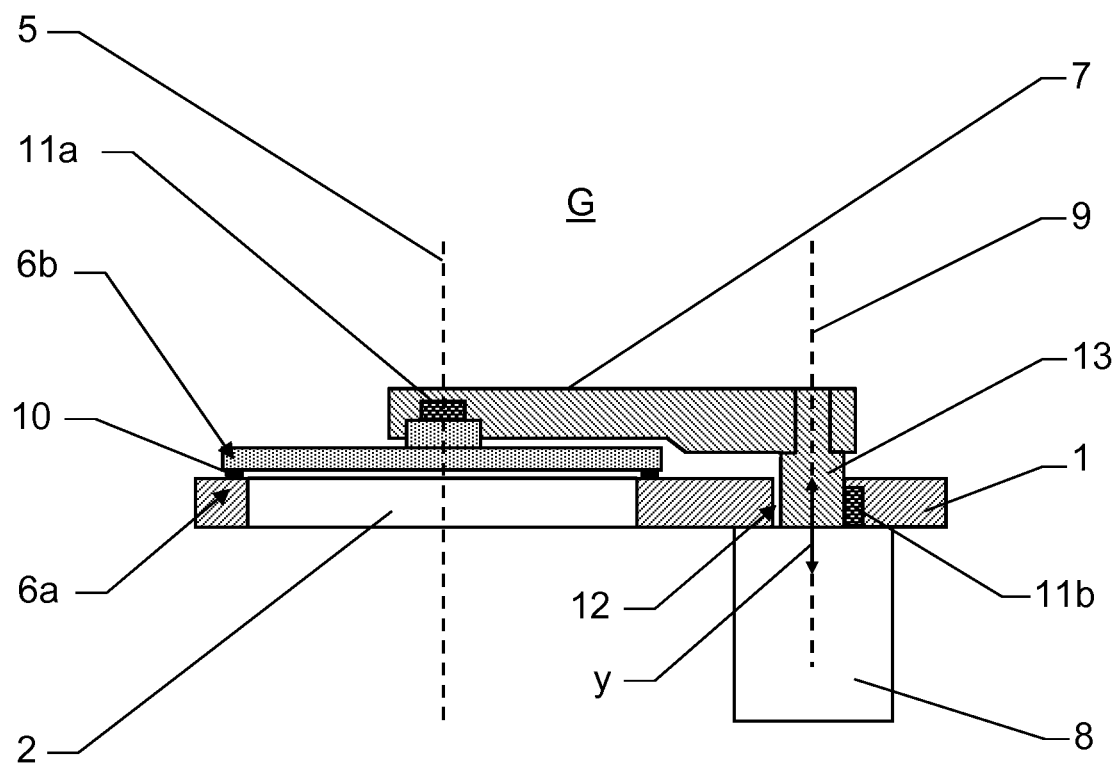

FIG. 1a and FIG. 1b schematically show a possible embodiment of the valve according to the invention in the form of a pendulum valve. The valve for substantially gas-tight interruption of a flow path has a valve housing 1, which comprises an opening 2. The opening 2 has a circular cross section here, for example. The opening 2 is enclosed by a valve seat 3. This valve seat 3 is formed by a sealing surface 6a, which faces axially in the direction of a valve plate 4, extends transversely in relation to the opening axis 5, has the shape of a circular ring, and is formed in the valve housing 1. The valve plate 4 is pivotable and is adjustable substantially parallel to the opening axis 5. In a closed position G (FIG. 1b) of the valve plate 4 (valve closure), the opening 2 is closed gas-tight by means of the valve plate 4. An open position O of the valve plate 4 is illustrated in FIG. 1a.

The valve plate 4 is connected via an arm 7, which is arranged laterally on the plate and extends perpendicularly in relation to the opening axis 5, to a drive 8 (motor). In the closed position G of the valve plate 4, this arm 7 is located outside the opening cross section of the opening 2 geometrically projected along the opening axis 5.

The drive 8 is designed by use of a corresponding gearing in such a way that the valve plate 4—as is routine in a pendulum valve—is pivotable by means of a transverse movement x of the drive 8 transversely in relation to the opening axis 5 and substantially parallel over the cross section of the opening 2 and perpendicularly in relation to the opening axis 5 in the form of a pivot movement around a pivot axis 9 between an open position O and an intermediate position and is linearly displaceable by means of a longitudinal movement y of the drive 8 taking place parallel to the opening axis 5. In the open position O, the valve plate 4 is positioned in a dwell section arranged laterally adjacent to the opening 2, so that the opening 2 and the flow path are released. In the intermediate position, the valve plate 4 is positioned spaced apart above the opening 2 and covers the opening cross section of the opening 2. In the closed position, the opening 2 is closed gas-tight and the flow path is interrupted, by a gas-tight contact existing between the valve closure 4 (valve plate) and the sealing surface 6a of the valve seat.

To enable automated and regulated opening and closing of the valve, the valve provides, for example, an electronic regulating and control unit, which is designed and is connected to the drive 8 in such a way that the valve plate 4 is adjustable accordingly for closing off a process volume in a gas-tight manner or for regulating an internal pressure of this volume.

In the present exemplary embodiment, the drive 8 is designed as an electric motor, wherein the gearing can be switched over in such a way that driving of the drive 8 causes either the transverse movement x or the longitudinal movement y. The drive 8 and the gearing are electronically activated by the regulator. Such gearings, in particular having gate-type shifting, are known from the prior art. Furthermore, it is possible to use multiple drives to effectuate the transverse movement x and the longitudinal movement y, wherein the control takes over the activation of the drives.

The precise regulating and/or setting of the flow rate using the described pendulum valve is possible not only by way of the pivoting adjustment of the valve plate 4 between the open position O and the intermediate position by means of the transverse movement x, or rather above all by linear adjustment of the valve plate 4 along the opening axis 5 between the intermediate position and the closed position by means of the longitudinal movement y. The described pendulum valve can be used for precise regulating tasks.

Both the valve plate 4 and also the valve plate 3 each have a sealing surface 6a, 6b—a first and a second sealing surface. The first sealing surface 6a moreover comprises a seal 10. This seal 10 can be vulcanized as a polymer onto the valve seat 3 by means of vulcanization, for example. Alternatively, the seal 10 can be embodied, for example, as an O-ring in a groove of the valve seat 3. A seal material can also be adhesively bonded on the valve seat 3 and thus embody the seal 10. In an alternative embodiment, the seal 10 can be arranged on the side of the valve plate 4, in particular on the second sealing surface 6b. Combinations of these embodiments are also conceivable.

The valve plate 4 is variably set, for example, on the basis of control variables and an output control signal. An item of information about a present pressure status in a process volume connected to the valve is obtained as an input signal, for example. Moreover, a further input variable, for example, a mass feed flow into the volume, can be provided to the regulator. A regulated setting of the valve over the time of a regulating cycle then takes place on the basis of these variables and on the basis of a predetermined target pressure, which is to be set and/or achieved for the volume, so that a mass drain flow out of the volume can be regulated over time by means of the valve. For this purpose, a vacuum pump is provided behind the valve, i.e., the valve is arranged between the process chamber and the pump. A desired pressure curve can thus be adjusted.

By way of the setting of the valve closure 4, a respective opening cross section is set for the valve opening 2 and thus the possible gas quantity is set which can be evacuated per unit of time out of the process volume. The valve closure 4 can have a shape deviating from a circular shape for this purpose, in particular to achieve the most laminar possible media flow.

To set the opening cross section, the valve plate 4 is adjustable by the regulating and control unit by means of the transverse movement x of the drive 8 from the open position O into the intermediate position and by means of the longitudinal movement y of the drive 8 from the intermediate position into the closed position. To completely open the flow path, the valve plate 4 is adjustable by the controller by means of the longitudinal movement y of the drive 8 from the closed position into the intermediate position and from there by means of the transverse movement x of the drive 8 from the intermediate position into the open position O.

The contact pressure of the valve plate 4 on the valve seat 5 has to take place in such a way that both the required gas-tightness is ensured inside the entire pressurized region and also damage to the seal 10 due to excessively large pressure strain is avoided. To ensure this, known valves provide a contact pressure regulation of the valve plate 4 regulated as a function of the pressure difference prevailing between the two valve plate sides.

In particular in the case of large pressure variations or the change from partial vacuum to overpressure, or vice versa, however, a uniform force distribution cannot always be ensured during a regulating process, i.e., a variation of the opening cross section. Depending on the valve strain, the seal 10 (the seal material), the valve plate 4, and the sealing surfaces 6a, 6b are thus strained differently, for example, whereby, for example, variable effective maintenance intervals result depending on the valve strain.

In the prior art, a valve closure is typically replaced and/or renovated at fixed time intervals as a precaution to avoid a possibly occurring leakage or to keep the quality of the seal at a sufficiently high level consistently. This has the disadvantage, inter alia, that valve parts are usually renovated or replaced before the passage of the regular or actual service life thereof.

According to the present invention, the vacuum valve comprises a sensor assembly having at least one force sensor, in the example shown two force sensors 11a, 11b, whereby, for example, monitoring and minimization of a seal wear of the vacuum valve can take place.

For example, to acquire a seal compression, which is generated by the sealing surfaces 6a, 6b corresponding to one another, of the seal 10 located between the sealing surfaces 6a, 6b, the compression force can be measured by means of a pressure sensor 11a, 11b independently of pressure variations of the process chamber or the wear of the other components. The compression force can thus be regulated over a process duration, for example, in real time. The seal wear can thus be reduced and the maintenance intervals can accordingly be lengthened.

Furthermore, measurement signals can then be acquired by means of the sensor assembly and an item of status information of the vacuum valve can be derived on the basis of these signals, for example, with respect to a contact pressure of the sealing surfaces on the seal, for example, to derive a structural formation of the sealing surfaces 6a, 6b and the seal 10. The status of the vacuum valve can thus be monitored and progressively evaluated.

In the example shown, the sensor assembly comprises a force sensor 11a arranged in the transverse arm 7, wherein the force sensor 11a comprises, for example, a strain gauge, which is vapor deposited on one side of the force sensor 11a, for a force measurement. The force sensor 11a acquires, for example, a normal force from the valve plate 4 on the transverse arm 7.

Alternatively, a force sensor could be provided, for example, by the valve plate 4, for example, for acquiring a force from the sealing surface 6b of the valve plate on the remaining parts of the valve plate 4 or a pressure-sensitive element of the force sensor can be applied to one of the sealing surfaces 6a, 6b on the seal side, for example, to directly acquire a force acting from the seal 10 on the sealing surfaces 6a, 6b.

In the example shown, the sensor assembly furthermore comprises a second force sensor 11b, provided by the guide 12 of the driveshaft 13 of the drive 8. The second force sensor 11b acquires, for example, a force perpendicular to the pivot axis 9, wherein items of information with respect to a contact pressure of the valve plate 4 on the seal 10 can be derived by knowing the structural features of parts of the vacuum valve, in particular of the transverse arm 7 and the coupling of the transverse arm 7 to the driveshaft 13 and the valve plate 4.

Alternatively to a pendulum valve as shown, the vacuum valve according to the invention can be implemented using another vacuum valve type, for example, a flap valve, slide valve, or a so-called butterfly regulating valve. The valve according to the invention is designed in particular for use in the vacuum field. Furthermore, pendulum valves are also usable, whose closure can only be adjusted in one direction.

FIG. 2a to FIG. 2c schematically show one possible embodiment of the valve according to the invention in the form of a transfer valve, illustrated in different closure positions.

The transfer valve shown is a special form of a slide valve. The vacuum valve has a rectangular, plate-shaped closure element 4 (for example, valve plate), which comprises a sealing surface 6b for the gas-tight closing of an opening 2. The opening 2 has a cross section corresponding to the closure element 4 and is formed in a wall 14. The opening 2 is enclosed by a valve seat 3, which in turn also provides a sealing surface 6a corresponding to the sealing surface 6b of the closure element 4. The sealing surface 6b of the closure element 4 extends circumferentially around the closure element 4 and carries a seal material 10 (seal). In a closed position, the sealing surfaces 6a, 6b are pressed against one another and the seal material is compressed between the two sealing surfaces 6a, 6b.

The opening 2 connects a first gas region L, which is located on the left of the wall 14, to a second gas region R on the right of the wall 14. The wall 14 is formed, for example, by a chamber wall of a vacuum chamber. The vacuum valve is then formed by an interaction of the chamber wall 14 with the closure element 4.

The closure element 4 is arranged on an adjustment arm 15, which is rod-shaped here, for example, and extends along a geometric adjustment axis 16. The adjustment arm 15 is mechanically coupled to a drive unit 8, by means of which the closure element 4 is adjustable in the first gas region L on the left of the wall 14 by adjustment of the adjustment arm 15 by means of the drive unit 8 between an open position O (FIG. 2a) via an intermediate position Z (FIG. 2b), into a closed position G (FIG. 2c).

In the open position O, the closure element 4 is located outside the projection region of the opening 2 and releases it completely, as shown in FIG. 2a.

By adjusting the adjustment arm 15 in the axial direction parallel to the adjustment axis 16 and parallel to the wall 4, the closure element 4 can be adjusted by means of the drive unit 8 from the open position O into the intermediate position Z.

In this intermediate position Z, the sealing surface 6b of the closure element covers the opening 2 and is located in a position spaced apart opposite to the sealing surface 6a of the valve seat 3 enclosing the opening 2, as shown in FIG. 2b.

By adjusting the adjustment arm 15 in the direction transverse in relation to the adjustment axis 16, i.e., for example, perpendicularly in relation to the wall 14 and the valve seat 3, the closure element 4 can be adjusted from the intermediate position Z into the closed position G (FIG. 2c).

In the closed position G, the closure element 4 closes the opening 2 in a gas-tight manner and separates the first gas region L from the second gas region R in a gas-tight manner.

The opening and closing of the vacuum valve are thus performed by means of the drive unit 8 by way of an L-shaped movement of the closure element 4 and the adjustment arm 15. The transfer valve shown is therefore also called an L-type valve.

A transfer valve as shown is typically provided for sealing off a process volume (vacuum chamber) and for loading and unloading the volume. Frequent changes between the open position O and the closed position G are the rule in the case of such a use. In this way, increased appearances of wear of the sealing surfaces 6a, 6b and the seal 10 can occur.

According to the invention, a sensor assembly having at least one force sensor is provided for acquiring a measurement signal with respect to a seal compression generated by the sealing surfaces 6a, 6b of the seal 10 located between the sealing surfaces 6a, 6b. The acquired measurement signal can be used in particular for monitoring and regulating an optimized contact pressure.

In the example shown, a force sensor 11c is arranged in the valve closure 4 and acquires, for example, a deformation of the valve closure 4 generated by the contact pressure of the two sealing surfaces 6a, 6b.

Therefore, for example, by way of the sensor assembly according to the invention, the leak-tightness of the valve can be checked during a process sequence, the contact pressure can be regulated accordingly, and if necessary a failure of the leak-tightness can be predicted. In particular, for example, the compression can be individually set using an electrical drive unit 8. It could at least be checked using the sensor assembly whether the valve is closed using a pneumatic L-motion drive.

Figure 3B:
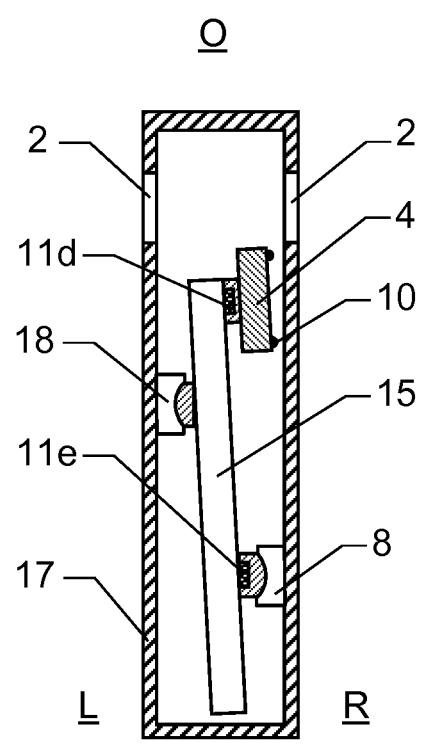
Figure 4B:
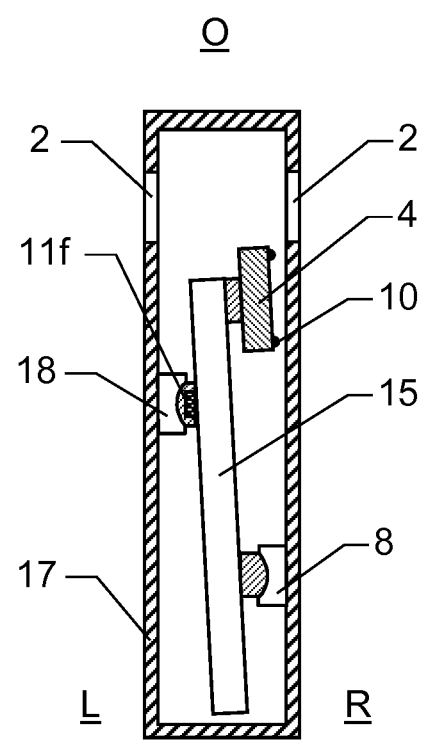

FIGS. 3a, 3b and FIGS. 4a, 4b, respectively, schematically show two further possible sensor assemblies in transfer valves according to the invention, illustrated in a closed position G (FIG. 3a, FIG. 4a) and an open position O (FIG. 3b, FIG. 4b).

The reference signs used in the preceding figures apply similarly here. In the figures shown, the valve seat 3 is furthermore formed on a housing 17 of the vacuum valve. However, it is clear to a person skilled in the art that the following description is applicable substantially similarly to embodiments, wherein the valve seat 3 is provided by a process chamber, i.e., a chamber housing.

Furthermore, it is self-evident that the valve mechanism shown here solely schematically as a tilting mechanism is not to be understood as restrictive and a person skilled in the art can transfer the sensor assembly according to the invention, for example, in a similar manner to an arbitrary L-motion drive, for example, an L-motion drive having two linear adjustment directions of the valve plate perpendicular to one another.

For the controlled guiding of the adjustment arm 15, the vacuum valve here comprises, for example, a guide component 18, wherein the drive unit 8 and the guide component 18 are each in a fixed assembly in relation to one another, here, for example, in that both the drive unit 8 and also the guide component 18 are each connected fixed in place to the valve housing 17. The adjustment arm 15 is furthermore mechanically coupled to the valve closure 4 and the drive unit 8, wherein by adjusting the adjustment arm 15, by means of the drive unit 8, the valve closure 4 is adjustable between the open position O and the closed position G substantially parallel to the valve seat 3, in particular in an L-motion movement as described in FIGS. 2a to 2d.

The sensor assembly can now be designed in such a way that the measurement signal acquires a force from the second coupling component on the first support element and/or from the first support element on the second coupling component.

The sensor assembly shown in FIGS. 3a and 3b comprises by way of example two force sensors 11d, 11e, wherein one force sensor 11d is provided by the valve closure 4 and the other force sensor 11e is provided by the drive unit 8. The assembly enables, for example, a direct acquisition in each case of a force from the drive unit 8 on the adjustment arm 15 and a force from the valve closure 4 on the adjustment arm 15.

Thus, for example, an item of status information of the vacuum valve, for example, with respect to a mechanical and/or structural integrity of the sealing surfaces 6a, 6b or the seal 10, can be derived based on an actual-target comparison for the acquired measurement signal with respect to a known force acting from the drive unit 8 on the adjustment arm 15. For this purpose, the measurement signal can be compared to known tolerance values as a function of the forces acting on the adjustment arm and, for example, a warning signal can optionally be provided for a user in the event of a doubt with respect to the provided sealing action.

The sensor assembly shown in FIGS. 4a and 4b comprises a single force sensor 11f, provided by the guide component 18. The force sensor 11f thus directly acquires a force which acts from the adjustment arm 15 on the guide component 18, on the one hand. Furthermore, however, by knowing structural features of parts of the vacuum valve, a contact pressure with respect to a point in the vacuum valve can be derived, which is not acquired directly by the assembly of the single force sensor 11f in the vacuum valve. An assembly of a single force sensor 11f can thus be sufficient under given circumstances for a regulation of the vacuum valve or for an acquisition of the status of the vacuum valve.

In particular, for example, the sensor assembly can therefore be designed in such a way that, for example, a force sensor does not have to be moved into the vacuum region itself and thus a comparatively lesser constructive expenditure can be ensured.

FIGS. 5a, 5b schematically show a further possible sensor assembly, for example, in a so-called monovalve here, illustrated in a closed position G (FIG. 5a) and an open position O (FIG. 5b).

The valve for the gas-tight closing of a flow path by means of a linear movement comprises a valve housing 17 having an opening 2 for the flow path, wherein the opening 2 comprises a geometric opening axis 5 along the flow path. The closure element 4 is displaceable linearly along a geometric adjustment axis 18 extending transversely in relation to the opening axis 5 in a closure element plane 20 from an open position O, which releases the opening 2, into a closed position G, which is pushed linearly over the opening 2, in a closing direction and vice versa back in an opening direction.

For example, a curved first sealing surface 6a encloses the opening 2 of the valve housing 17 along a first section 21a in a first plane 22a and along a second section 21b in a second plane 22b. The first plane 22a and the second plane 22b are spaced apart from one another and extend parallel to one another and parallel to the closure element plane 20. The first section 21a and the opposing second section 21b therefore have a geometric offset in relation to one another transversely in relation to the adjustment axis 19 and in the direction of the opening axis 5. The opening 2 is arranged between the two opposing sections 21a and 21b in the region extending along the adjustment axis 19.

The closure element 4 comprises a second sealing surface 6b, which corresponds to the first sealing surface 6a and extends along sections corresponding to the first and second section 21a, 21b.

Monovalves, i.e., vacuum valves closable by means of a single linear movement, have the advantage, for example, of a comparatively simple closing mechanism, for example, compared to the transfer valves closable by means of two movements, which require a comparatively complexly constructed drive. Since the closure element can moreover be formed in one piece, it can be subjected to high acceleration forces, so that this valve can also be used for rapid closures and emergency closures. The closing and sealing can take place by means of a single linear movement, so that very rapid closing and opening of the valve is possible here.

In particular, one advantage of monovalves is that, for example, the seal is not subject to transverse strain in the transverse direction in relation to the longitudinal extension of the seal because of its course during closing. On the other hand, the seal is hardly capable because of its transverse extension in relation to the opening axis 5 of absorbing forces occurring on the closure element 4 along the opening axis 5, which can act on the closure element 4 in particular in the event of large differential pressure, which requires a robust construction of the closure element 4, its drive, and its mounting.

The sensor assembly shown in FIGS. 5a and 5b comprises a single force sensor 11g, arranged in the closure element 4, for acquiring a force which acts from the adjustment arm 15 on the closure element 4. Thus, for example, by knowing structural features of parts of the vacuum valve, a measurement signal can again be acquired with respect to a seal compression generated by the first 6a and the second 6b sealing surface of the seal 10 located between the first and the second sealing surface.

It is obvious that these illustrated figures only schematically illustrate possible exemplary embodiments. The various approaches can also be combined with one another and with methods of the prior art.

The invention claimed is:

1. A vacuum valve for the regulation of a volume or mass flow or for the gas-tight interruption of a flow path, comprising:
    a valve seat, which comprises a valve opening defining an opening axis and a first sealing surface circumferential around the valve opening,
    a valve closure for the regulation of the volume or mass flow or for the interruption of the flow path, comprising a second sealing surface corresponding to the first sealing surface, whose variable location is defined by the respective position and alignment of the valve closure, a drive unit coupled to the valve closure, which is designed such that the valve closure is adjustable from an open position (O), in which the valve closure and the valve seat are provided without contact in relation to one another, into a closed position (G), in which an axially-sealing contact exists between the first sealing surface and the second sealing surface via an interposed seal, and the valve opening is thus closed in a gas-tight manner, and back, wherein the vacuum valve furthermore comprises a sensor assembly having at least one force sensor comprising a deformation-sensitive element, wherein the sensor assembly is designed in such a way that a measurement signal is acquired, which provides detection of a seal compression of the interposed seal between the first sealing surface and the second sealing surface, the seal compression being generated by the first and the second sealing surface.

2. The vacuum valve according to claim 1, wherein the sensor assembly is designed in such a way that a measurement signal acquires
 a force acting from at least a part of the seal on at least a part of the first sealing surface and/or
 a force acting from at least a part of the seal on at least a part of the second sealing surface.

3. The vacuum valve according to claim 1, wherein the sensor assembly is designed in such a way that the deformation-sensitive element is arranged on a part of the valve seat or the valve closure, respectively, comprising at least a part of the first and/or the second sealing surface.

4. The vacuum valve according to claim 1, wherein the valve closure is coupled via a coupling component to the drive unit and the sensor assembly is designed in such a way that the measurement signal acquires a force
 from the coupling component on the valve closure and/or
 from the coupling component on the drive unit and/or
 from the valve closure on the coupling component and/or
 from the drive unit on the coupling component.

5. The vacuum valve according to claim 1, wherein the vacuum valve comprises a valve housing, wherein the drive unit is connected to the valve housing,
 the valve closure is coupled via a coupling component to the drive unit, and
 the coupling component presses against a support element connected to the valve housing for controlled guiding of the coupling component,
 wherein the sensor assembly is designed in such a way that the measurement signal acquires a force
 from the coupling component on the support element and/or
 from the support element on the coupling component.

6. The vacuum valve according to claim 1, wherein the vacuum valve defines a vacuum region separated from an external environment and force sensors of the sensor assembly contributing to the measurement signal are arranged outside the vacuum region.

7. The vacuum valve according to claim 1,
 wherein the valve seat
 is formed by a part of the vacuum valve structurally connected to the vacuum valve.

8. The vacuum valve according to claim 1, wherein the vacuum valve comprises a vacuum slide valve, a pendulum valve, or a monovalve.

9. The vacuum valve according to claim 1, wherein the deformation-sensitive element comprises a strain gauge force sensor.

10. The vacuum valve according to claim 1, wherein the valve seat is formed on a housing of the vacuum valve, or is provided by a process chamber or a process chamber housing.

11. The vacuum valve according to claim 1, wherein controlled by a control and regulating unit of the vacuum valve, the drive unit is activated using predefined control values to adjust the valve closure between the open position (O) and the closed position (G), and
 the drive unit, the valve closure, and the sensor assembly are designed and interact in such a way that the control values are set based on the measurement signal.

12. The vacuum valve according to claim 11, wherein the measurement signal continuously corresponds to a predefined target value.

13. The vacuum valve according to claim 1, wherein the vacuum valve comprises a processing unit designed in such a way that the acquired measurement signal is processable via of the processing unit and an item of status information is generated on the basis of the acquired measurement signal.

14. The vacuum valve according to claim 13, wherein the status information is provided with respect to a mechanical and/or structural integrity of the first sealing surface and/or the second sealing surface and/or the seal, or wherein the status information is generated via an actual-target comparison for the acquired measurement signal.

15. The vacuum valve according to claim 13, wherein an output signal is provided with respect to an evaluation of a process controlled by the vacuum valve based on a comparison of the status information to predefined tolerance values.

16. The vacuum valve according to claim 1, wherein the valve closure is coupled via a coupling component to the drive unit, wherein the coupling component comprises at least one adjustment arm and the at least one adjustment arm is mechanically coupled to the valve closure and the drive unit, wherein the valve closure is adjustable between the open position (O) and the closed position (G) substantially parallel to the valve seat by adjusting the at least one adjustment arm via the drive unit.

17. The vacuum valve according to claim 16, wherein the sensor assembly is designed in such a way that the measurement signal acquires a force
 from the at least one adjustment arm on the valve closure and/or
 from the valve closure on the at least one adjustment arm and/or
 from the at least one adjustment arm on the drive unit and/or
 from the drive unit on the at least one adjustment arm.

18. The vacuum valve according to claim 16, wherein
 the vacuum valve comprises a valve housing, wherein the drive unit is connected to the valve housing,
 the valve closure is coupled via the coupling component to the drive unit, and
 the at least one adjustment arm presses against a support element connected to the valve housing for controlled guiding of the at least one adjustment arm,
 wherein the sensor assembly is designed in such a way that the measurement signal acquires a force
 from the at least one adjustment arm on the support element and/or from the support element on the at least one adjustment arm.

19. The vacuum valve according to claim 16, wherein at least one of the following comprises the force sensor comprising the deformation-sensitive element of the sensor assembly the valve closure,
the support element,
the drive unit, and
the coupling component, which is the at least one adjustment arm.

\* \* \* \* \*